(12) United States Patent
Fujii

(10) Patent No.: US 9,845,881 B2
(45) Date of Patent: Dec. 19, 2017

(54) SHAFT SEAL

(71) Applicant: MITSUBISHI CABLE INDUSTRIES, LTD., Tokyo (JP)

(72) Inventor: Nobukazu Fujii, Arida (JP)

(73) Assignee: MITSUBISHI CABLE INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/715,450

(22) Filed: May 18, 2015

(65) Prior Publication Data

US 2015/0337963 A1 Nov. 26, 2015

(30) Foreign Application Priority Data

May 20, 2014 (JP) ................. 2014-104194

(51) Int. Cl.
| | |
|---|---|
| *F16J 15/322* | (2016.01) |
| *F16J 15/3268* | (2016.01) |
| *F16J 15/3276* | (2016.01) |
| *F16J 15/3228* | (2016.01) |

(52) U.S. Cl.
CPC ......... *F16J 15/322* (2013.01); *F16J 15/3228* (2013.01); *F16J 15/3268* (2013.01); *F16J 15/3276* (2013.01)

(58) Field of Classification Search
CPC .... F16J 15/322; F16J 15/3228; F16J 15/3276; F16J 15/3268
See application file for complete search history.

(56) References Cited

U.S. PATENT DOCUMENTS

| | | | | |
|---|---|---|---|---|
| 2,438,794 | A * | 3/1948 | Waring | F16J 15/322 277/553 |
| 3,801,114 | A * | 4/1974 | Bentley | F16J 15/3244 277/559 |
| 3,938,813 | A * | 2/1976 | Forch | F16J 15/3228 277/556 |
| 3,984,113 | A * | 10/1976 | Bentley | F16J 15/3244 277/559 |
| 4,119,324 | A * | 10/1978 | Denton | F16J 15/3248 277/559 |
| 4,283,064 | A * | 8/1981 | Staab | F16J 15/3228 277/559 |
| 5,054,329 | A * | 10/1991 | Morishita | F02N 15/00 277/577 |
| 5,460,386 | A * | 10/1995 | McCoy | F16J 15/3228 277/553 |
| 6,702,295 | B1 * | 3/2004 | Kapcoe | F16J 15/3228 277/551 |
| 8,052,153 | B2 * | 11/2011 | Ebihara | F16J 15/3232 277/560 |
| 9,163,731 | B2 * | 10/2015 | Sanada | F16J 15/3228 |
| 2003/0098549 | A1 * | 5/2003 | Mellet | F16J 15/3228 277/559 |

(Continued)

FOREIGN PATENT DOCUMENTS

JP 2009-103264 A1 5/2009

*Primary Examiner* — Eugene G Byrd
(74) *Attorney, Agent, or Firm* — Kratz, Quintos & Hanson, LLP

(57) ABSTRACT

A shaft seal in which a seal element a seal element and a gasket as held members are held between an outer case and an inner case, and, a protruding portion to locally increase holding pressure on the seal element is disposed on a pressing face for held member of the inner case.

2 Claims, 4 Drawing Sheets

(56) References Cited

U.S. PATENT DOCUMENTS

| | | | |
|---|---|---|---|
| 2005/0086802 A1* | 4/2005 | Lang | B25B 27/0092 |
| | | | 29/888 |
| 2005/0151322 A1* | 7/2005 | Kobayashi | F16J 15/3284 |
| | | | 277/309 |
| 2006/0208428 A1* | 9/2006 | Oiyama | F16J 15/3228 |
| | | | 277/551 |
| 2008/0067759 A1* | 3/2008 | Ashida | F16J 15/3216 |
| | | | 277/644 |

* cited by examiner

SHAFT SEAL

FIELD OF THE INVENTION

This invention relates to a shaft seal, for example, a shaft seal used for EGR-V, vacuum pumps, compressors, etc.

DESCRIPTION OF THE RELATED ART

Conventionally, as shown in FIG. 7, a shaft seal, in which a seal element 22 and a gasket 23 are held between an inner case 20 and an outer case 21, is known (refer to Japanese Provisional Publication No. 2009-103264, for example).

However, in the above-mentioned shaft seal, the seal element 22 may co-rotate (in case of a rotation shaft seal) or drop off (in case of a reciprocating seal). Especially, in case that the gasket 23 is omitted, the above-mentioned disadvantage is greatly revealed.

Therefore, it is an object of the present invention to provide a shaft seal with which the seal element can be certainly prevented from the co-rotation and dropping, and thickness dimension of the gasket can be reduced or the gasket can be omitted to make the seal compact and reduce the production cost.

BRIEF DESCRIPTION OF THE DRAWINGS

The present invention will be described with reference to the accompanying drawings, in which.

DESCRIPTION OF THE PREFERRED EMBODIMENTS

Preferred embodiments of the present invention will now be described with reference to the accompanying drawings.

Figure 1:
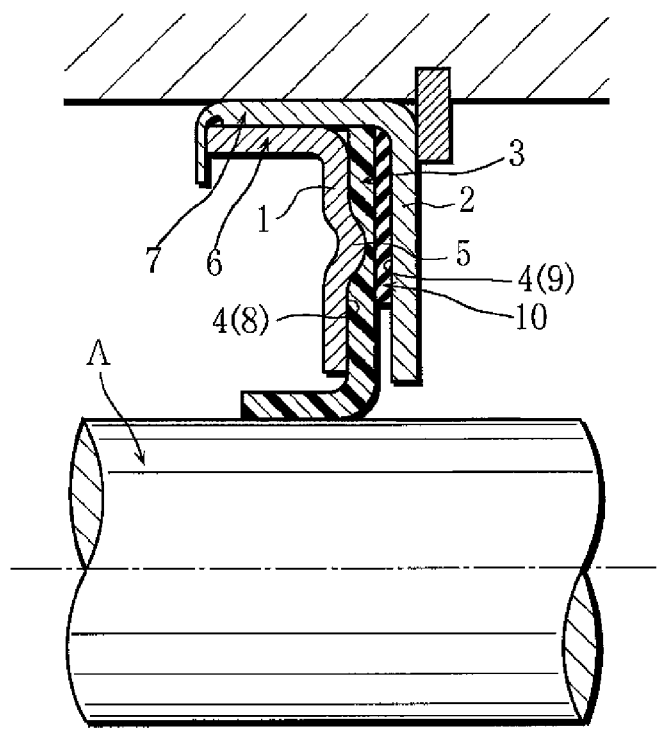
FIG. 1 is a cross-sectional view of a principal portion showing a used state of a first embodiment of the present invention.
Figure 2:
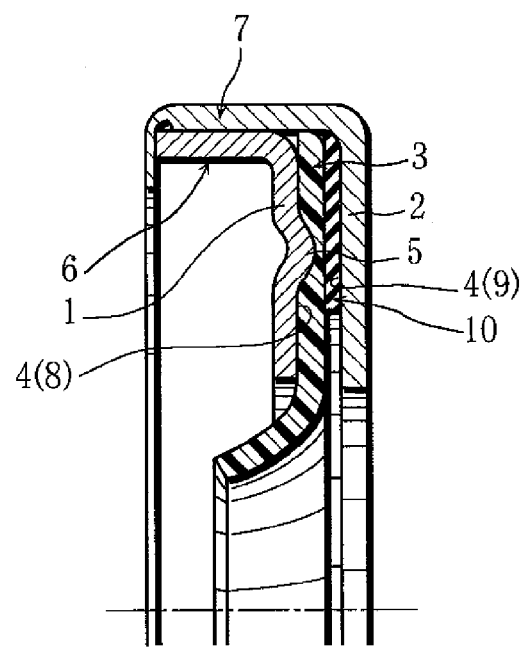
FIG. 2 is a cross-sectional view of a principal portion of an unused state.

FIG. 1 and FIG. 2 show a first embodiment of the present invention. This shaft seal is used for sealing a shaft A for rotation movement or reciprocating movement. A seal element 3 and a gasket 10 as held members are held by an outer case 7 and an inner case 6 in the shaft seal. Concretely, the shaft seal is composed of the outer case 7, the inner case 6, the seal element 3 and the gasket 10 held by the outer case 7 and the inner case 6. A protruding portion 5 to locally increase holding pressure is disposed on a pressing face 4 for held members of the inner case 6.

The inner case 6 has a first wall portion 1 at right angles with an axis, and the outer case 7 has a second wall portion 2 at right angles with the axis. The inner case 6, the outer case 7, the seal element 3, and the gasket 10 are pressed and unified by caulking of the outer case 7, and the seal element 3 and the gasket 10 are held by the first wall portion 1 and the second wall portion 2. The protruding portion 5 is disposed on a pressing face 8 for held members of the first wall portion 1. The seal element 3 can be prevented from co-rotation (in case of a rotation shaft seal) or drop off (in case of a reciprocating seal) because the seal element 3, having approximately uniform thickness for the entire periphery in free state, is locally compressed by the protruding portion 5, and holding pressure of the seal element 3 is locally increased.

Figure 3:
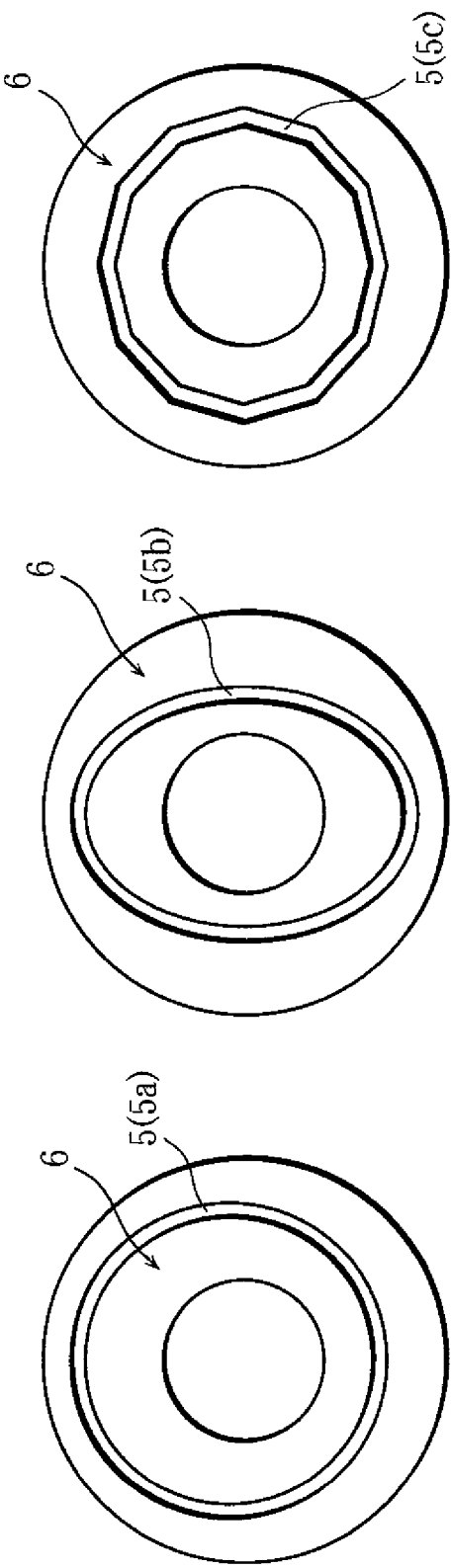
FIG. 3A is a side view in which an inner case is observed in an axial direction.
FIG. 3B is a side view in which an inner case is observed in an axial direction.
FIG. 3C is a side view in which an inner case is observed in an axial direction.

As shown in FIGS. 3A through 3C, the protruding portion 5 may be any of an eccentric circular protrusion 5a (FIG. 3A), an elliptic protrusion 5b (FIG. 3B), and a polygonal protrusion 5c (FIG. 3C) observed in the axial direction. And, although not shown in figures, the protruding portion 5 may be intermittent (in the peripheral direction) or a radial protrusion. Further, the pressing face 4 for held members may be a roulette-worked face or a rough face worked by blasting (not shown in figures).

Figure 4:
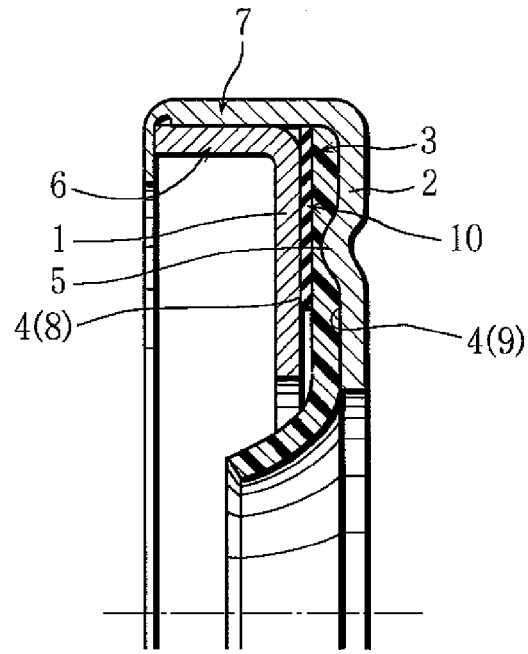
FIG. 4 is a cross-sectional view of a principal portion showing a second embodiment.

FIG. 4 shows a second embodiment. The protruding portion 5 to locally increase holding pressure on the seal element 3 is disposed on the pressing face 4 for held members of the outer case 7. When observed in the axial direction, the protruding portion 5 of similar configuration to that of FIGS. 3A through 3C is disposed on the pressing face 4 of the outer case 7. Other constructions are similar to that of the first embodiment.

As described above, with the protruding portion 5 disposed on the inner case 6 or the outer case 7, the thickness of the gasket can be made thin as in the first and the second embodiments, and the seal can be compact and the production cost can be reduced.

Figure 5:
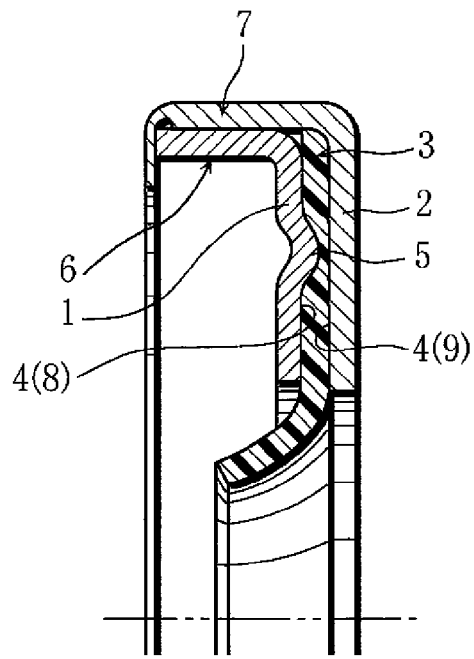
FIG. 5 is a cross-sectional view of a principal portion showing a third embodiment.

FIG. 5 shows a third embodiment of the present invention. In this shaft seal, the seal element 3 as a held member is held between the outer case 7 and the inner case 6.

Concretely, the shaft seal is composed of the outer case 7, the inner case 6, and the seal element 3 held by the outer case 7 and the inner case 6. The protruding portion 5 to locally increase holding pressure is disposed on the pressing face 4 of the inner case 6. The inner case 6, the outer case 7, and the seal element 3 are pressed and unified by caulking of the outer case 7, and the seal element 3 is held by the first wall portion 1 and the second wall portion 2. Other constructions are similar to that of the first embodiment.

Figure 6:
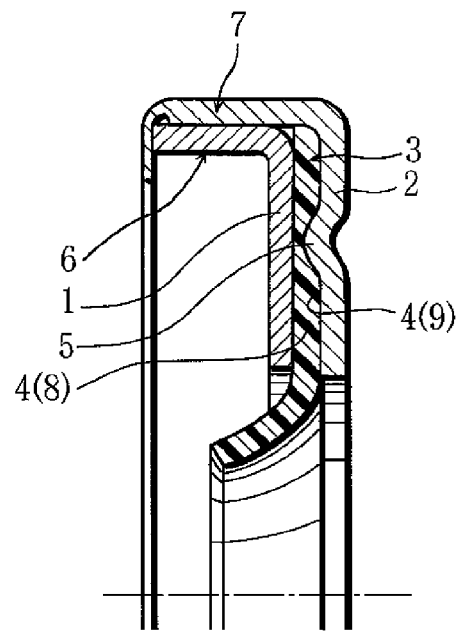
FIG. 6 is a cross-sectional view of a principal portion showing a fourth embodiment.
Figure 7:
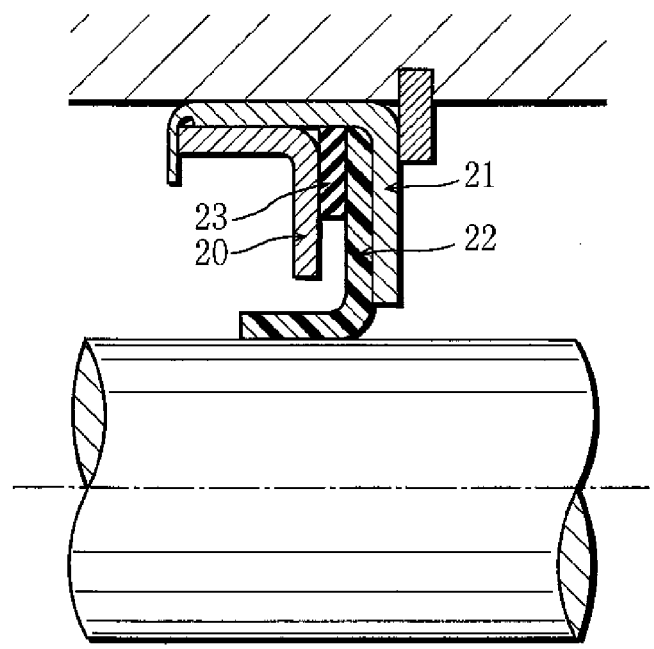
FIG. 7 is a cross-sectional view of a principal portion showing a conventional example.

FIG. 6 shows a fourth embodiment. The protruding portion 5 to locally increase holding pressure on the seal element 3 is disposed on the pressing face 4 for held members of the outer case 7. The protruding portion 5 is disposed on a pressing face 9 for held members of the second wall portion 2 at right angles with the axis. Other constructions are similar to that of the third embodiment.

In the present invention, being modifiable, for example, the polygonal protrusion 5c may be hexagonal, octagonal, etc. other than the dodecagon shown in FIG. 3C. And, the protruding portion 5 may be a wave in which round convexes and concaves continue in turn.

As described above, the seal element 3 can be certainly prevented from rotating and dropping because the shaft seal of the present invention is a shaft seal in which the seal element 3 as the held member is, or the seal element and the gasket 10 as the held members are held between the outer case 7 and the inner case 6, and, the protruding portion 5 to locally increase holding pressure is disposed on the pressing face 4 for held member of the inner case 6 or the outer case 7. And, the thickness dimension of the gasket 10 can be reduced, or the gasket 10 can be omitted, and the seal can be made compact and the production cost can be decreased.

And, the seal element 3 can be certainly prevented from rotating (in case of a rotation shaft seal) or dropping (in case of a reciprocating seal) because in the shaft seal, composed of the outer case 7, the inner case 6, and, the seal element 3 and the gasket 10 held between the outer case 7 and the inner case 6, and, the protruding portion 5 to locally increase holding pressure is disposed on the pressing face 4 for held member of the inner case 6 or the outer case 7. And, the thickness dimension of the gasket 10 can be reduced, and the seal can be made compact and the production cost can be decreased.

And, the seal element 3 can be certainly prevented from rotating and dropping because the inner case 6 has the first wall portion 1 at right angles with the axis, the outer case 7 has the second wall portion 2 at right angles with the axis, the seal element 3 and the gasket 10 are held with the first wall portion 1 at right angles with the axis and the second wall portion 2 at right angles with the axis, and, the protruding portion 5 is disposed on the pressing face 8 for held member of the first wall portion 1 at right angles with the axis or on the pressing face 9 for held member of the second wall portion 2 at right angles with the axis. And, the thickness dimension of the gasket 10 can be reduced, and the seal can be made compact and the production cost can be decreased.

And, the seal element 3 can be certainly prevented from rotating and dropping because in the shaft seal, composed of the outer case 7, the inner case 6, and the seal element 3 held between the outer case 7 and the inner case 6, and, the protruding portion 5 to locally increase holding pressure on the seal element 3 is disposed on the pressing face 4 for held member of the inner case 6 or the outer case 7. And, the gasket 10 can be omitted, and the seal can be made compact and the production cost can be decreased.

And, the seal element 3 can be certainly prevented from rotating and dropping because the inner case 6 has the first wall portion 1 at right angles with the axis, the outer case 7 has the second wall portion 2 at right angles with the axis, the seal element 3 is held with the first wall portion 1 at right angles with the axis and the second wall portion 2 at right angles with the axis, and, the protruding portion 5 is disposed on the pressing face 8 for held member of the first wall portion 1 at right angles with the axis or on the pressing face 9 for held member of the second wall portion 2 at right angles with the axis. And, the gasket 10 can be omitted, and the seal can be made compact and the production cost can be decreased.

And, rotation of the seal element can be stopped, and fluid leakage in radial direction can be certainly prevented further because the protruding portion 5 is one of the eccentric circular protrusion 5a, the elliptic protrusion 5b, and the polygonal protrusion 5c when observed in the axial direction.

While preferred embodiments of the present invention have been described in this specification, it is to be understood that the invention is illustrative and not restrictive, because various changes are possible within the spirit and indispensable features.

What is claimed is:

1. A shaft seal, composed of an outer case, an inner case, and, a seal element and a gasket held between the outer case and the inner case, comprising a construction in which a protruding portion for locally increasing holding pressure is disposed on a pressing face of held members of the inner case or the outer case, the seal element and the gasket being the held members;
   the inner case has a first wall portion at right angles with an axis, the outer case has a second wall portion at right angles with the axis, the seal element and the gasket are held with the first wall portion at right angles with the axis and the second wall portion at right angles with the axis, and, the protruding portion is disposed on a pressing face of adjacent the first wall portion at right angles with the axis or on a pressing face for held member of the held members adjacent the second wall portion at right angles with the axis;
   the protruding portion is extends along a circumferential path that is one of an eccentric circular protrusion, an elliptic protrusion, and a polygonal protrusion when observed in the axial direction; and
   the seal element abuts a shaft for rotation movement for sealing thereof,
   wherein a radial distance between the protruding portion and a shaft surface around a circumference of the rotation shaft varies, wherein a sliding resistance between the protruding portion and the seal element increases when the radial distance increases, and stops rotation of the seal element when the radial distance increases.

2. A shaft seal, composed of an outer case, an inner case, and a seal element held between the outer case and the inner case, comprising a construction in which a protruding portion for locally increasing holding pressure on the seal element is disposed on a pressing face of a held member of the inner case or the outer case, the seal element being the held member;
   the inner case has a first wall portion at right angles with an axis, the outer case has a second wall portion at right angles with the axis, the seal element is held with the first wall portion at right angles with the axis and the second wall portion at right angles with the axis, and, the protruding portion is disposed on a pressing face of the held member adjacent the first wall portion at right angles with the axis or on a pressing face of the held member adjacent the second wall portion at right angles with the axis;
   the protruding portion is extends along a circumferential path that is one of an eccentric circular protrusion, an elliptic protrusion, and a polygonal protrusion when observed in the axial direction; and
   the seal element abuts a shaft for rotation movement for sealing thereof,
   wherein a radial distance between the protruding portion and a shaft surface around a circumference of the rotation shaft varies, wherein a sliding resistance between the protruding portion and the seal element increases when the radial distance increases, and stops rotation of the seal element when the radial distance increases.

* * * * *